United States Patent
Herrmann et al.

(10) Patent No.: US 7,188,431 B2
(45) Date of Patent: Mar. 13, 2007

(54) METHOD OF AND DEVICE FOR DETERMINATION OF PENETRATION DEPTH

(75) Inventors: Guenter Herrmann, Guetersloh (DE); Oswin Moessner, Beelen (DE)

(73) Assignee: CLAAS Fertigungstechnik GmbH, Beelen (DE)

( * ) Notice: Subject to any disclaimer, the term of this patent is extended or adjusted under 35 U.S.C. 154(b) by 0 days.

(21) Appl. No.: 11/114,539

(22) Filed: Apr. 26, 2005

(65) Prior Publication Data

US 2005/0207855 A1 Sep. 22, 2005

(51) Int. Cl.
*B23Q 3/00* (2006.01)

(52) U.S. Cl. .............................. 33/642; 33/638; 33/833; 483/1; 29/243.53

(58) Field of Classification Search .................. 33/642, 33/638, 832–834, 836, 512, 542; 408/8–16; 175/40, 45; 433/27; 483/1, 31, 34–36; 29/243.53, 29/525.06
See application file for complete search history.

(56) References Cited

U.S. PATENT DOCUMENTS

| | | | | |
|---|---|---|---|---|
| 4,310,269 A | * | 1/1982 | Neu et al. | 408/11 |
| 4,850,763 A | * | 7/1989 | Jack et al. | 409/178 |
| 5,588,554 A | * | 12/1996 | Jones | 221/88 |
| 5,836,068 A | * | 11/1998 | Bullen et al. | 29/430 |
| 6,095,728 A | * | 8/2000 | Howie | 409/214 |
| 6,098,260 A | * | 8/2000 | Sarh | 29/243.53 |
| 6,158,666 A | * | 12/2000 | Banks et al. | 238/10 R |
| 6,665,948 B1 | * | 12/2003 | Kozin et al. | 33/833 |
| 6,855,099 B2 | * | 2/2005 | Hazlehurst et al. | 483/38 |
| 6,979,288 B2 | * | 12/2005 | Hazlehurst et al. | 483/1 |

\* cited by examiner

*Primary Examiner*—Diego Gutierrez
*Assistant Examiner*—Tania Courson
(74) *Attorney, Agent, or Firm*—Michael J. Striker

(57) ABSTRACT

For determining a depth of drilling in objects a path over which a resistance is measured which is produced by an object to be processed counteracts a processing tool during its advance movement, and the measured path is used for determination of a depth of drilling in the object.

14 Claims, 3 Drawing Sheets

METHOD OF AND DEVICE FOR DETERMINATION OF PENETRATION DEPTH

BACKGROUND OF THE INVENTION

The present invention relates to a method of determination of the penetration depth of a processing tool, as well as to a device for performing the method.

In aviation more and more frequently carbon fiber plates are used, for example for manufacture of fuselages, stabilizer shells and the like, for weight reasons. They are fixed with one another by glueing and additionally almost always connected by rivets for safety reasons. Depending on the dimension of an airplane, several thousands rivets can be required, in particular for connection of the shell-shaped outer coating parts of an airplane with one another. These very high quantities of the required rivets play a not insignificant role in the total weight. Because of this reason, it is recommended to select the rivet shaft lengths of the rivet, as required for the pressing and transverse forces, with consideration of the thickness of the plates to be connected with one another. When aluminum plates are used as the materials, the total material thickness can be determined summarily since the aluminum plates do not have significant tolerances in their thicknesses. Carbon fiber plates to the contrary are known to have very high tolerances with respect to their thickness. The exact borehole depth of a material composite, composed for example of carbon fiber plates which are fixed with one another by glueing, can not be summarily determined since the drilling depth depends significantly on how thick the adhesive medium was applied between the parts to be connected and what is the residual thickness of the adhesive medium after its hardening. This means that the depth of each opening must be measured separately and a rivet with a corresponding shaft length must be associated with a respective opening, to satisfy the high requirements of the smallest possible weight.

SUMMARY OF THE INVENTION

Accordingly, it is an object of the present invention to provide a method and a device, with which the penetration depth of a processing tool in an object can be determined in a simple manner.

In keeping with these objects and with others which will become apparent hereinafter, one feature of the present invention resides, briefly stated, in a method for determining a depth of drilling in objects, comprising the steps of measuring a path over which a resistance produced by an object to be processed counteracts a processing tool during its advance movement; and using the measured path for determination of a depth of drilling in the object.

By measuring the path, over which the processing tool during its advanced movement into the object to be worked is counteracted by a resistance produced during this step, a simply usable and reliably operating method for determination of the penetration depth of a processing tool into the object to be processed is provided. Such a method is especially reliable since cutting force dependent loads act on the processing tool only when the processing tool removes a material from the object to be processed. When the processing tool penetrates through the processing object, on the only friction-dependent loads act on the processing tool. They are however significantly smaller, so that depending on the high loads during penetration of the processing tool into the object to be processed, the penetration depth of the material or the material thickness can be determined in a very precise way.

An especially efficient implementation of the method is achieved when depending on the path covered by the processing tool against the material resistance, penetration depth signals and/or material thickness signals are generated.

An advantageous further embodiment of the method in accordance with the present invention is provided when the penetration signals and/or material thickness signals are available as input signals for further processes. In this way it is possible for example to visualize the penetration depth signals and/or material thickness signals. The visualization is provided in the simplest case in that a pressure-or injection-produced marking is obtained from the point of the object that is processed by the processing tool, and the corresponding penetration depth or material thickness results from the marking.

In accordance with another feature of the present invention, an especially simple embodiment of the method is obtained when the processing tool is formed as a drill or a mill.

Because of the precise and technically relatively simple determination of the penetration resistance of the processing tool, the inventive method can be used especially very efficiently when the object to be processed is a material composite, whose individual materials are glued to one another. The material composite can be composed of metallic and non-metallic materials.

During the penetration through a material composite the loads on the processing tool are substantially determined by the structure of the corresponding composite material and in the region of an adhesive medium layer are significantly lower than for example in the region of metallic materials or carbon fiber layers. Therefore, in accordance with a further embodiment of the present invention the load fluctuations during the movement of the processing tool are not taken into account during the movement of the processing tool through the object to be processed.

In accordance with a further embodiment of the present invention, the signal which is generated during the advance movement of the processing tool by the object to be processed and which describes the borehole depth of the material thickness is taken for selection of connection elements, which pass through depressions or throughgoing openings provided by the processing tool must pass. In this manner it is guaranteed that the connection elements are only such long as required in dependence on the opening to pass through. This has in particular the advantage that the mass of the connecting elements can be maintained low.

An especially simple embodiment is provided when the connecting elements are formed as rivets and the signals which are generated during the advance movement of the processing tool represent the borehole depth, and then the rivet shaft lengths is selected in accordance with these signals.

An especial advantageous further embodiment of the inventive method is provided when the signal which is generated during the advance of the processing tool through the object to be processed forms a measure for the wear of the processing tool. As a result, it can be guaranteed that a wear-dependent tool exchange is performed timely.

An especially advantageous further embodiment of the inventive method is provided when the signal which is generated during the advance of the processing tool through the object to be processed directly influences the advance speed or the rotary speed of the processing tool. This has the advantage that the cutting speed of the processing tool can be adjusted directly to the material to be processed.

From the point of the measuring technique, the determination of the load-dependent signals can be implemented especially simple by means of so-called piezo-sensors. Such sensors have high measuring accuracies and are simple to integrate in the corresponding processing tools.

An especially rational and flexible implementation of the inventive method is provided when the processing machine on which the processing tool is received is associated with a processing and mounting robots, and the control and evaluation unit generates output signals which allow an automatic taking of connecting elements and/or processing tools from supply magazines.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
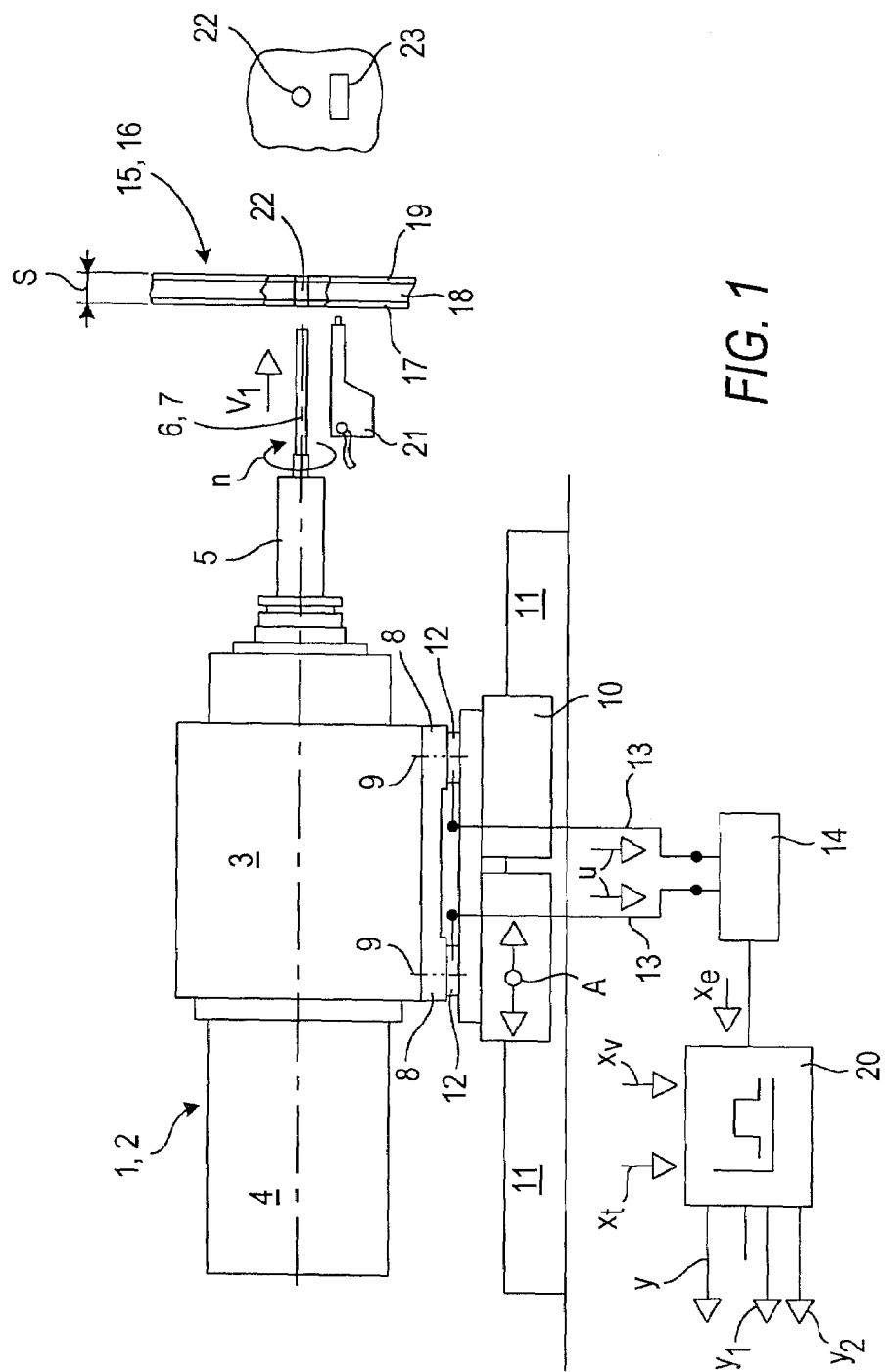
FIG. 1 is a view schematically showing a method for determination of a penetration depth in accordance with the present invention.

FIG. 1 schematically shows a processing machine 2 which is formed as a drilling unit 1, for illustration of a method in accordance with the present invention. The drilling unit 1 includes a housing 3 which accommodates a not shown transmission, and a drive motor 4 which is attached to the housing. On the other hand, a clamping chuck 5 is associated with a housing 3. In a shown embodiment it receives a processing tool 7 which is formed as a drill 6. Flange surfaces 8 are formed at the lower side of the housing 3. They connect the drilling unit 1 with a guide carriage 10 by a plurality of screw connections 9. The guide carriage 10 is arranged displaceably in a horizontal direction of arrow A on one or several guide tracks 11 as well known.

For performing the method in accordance with the present invention, the flange surfaces 8 of the housing 3 of the drilling unit 1 placed in the region of the screw connections 9 are placed on piezo-sensors 12 which are connected with a signal amplifier unit 14 through an electrical conductor system 13.

In the region of the processing tool 7, the object 15 to be processed is stationarily associated with it. In the shown embodiment the object 15 to be processed is formed as a composite material 16. The composite material 16 is composed for example of three layers 17, 18, and 19. In the present invention the layers 17, 18, 19 of the composite material 16 can be composed of metallic and/or non-metallic materials. It is recommended for example that the outer layers 17 and 19 are metallic or non-metallic workpieces which are connected with one another by glue, so that the central layer 18 of the composite material 16 incorporates the adhesive agent.

When the unit 1 is displaced on the guide tracks 11 in direction to the object 15 to be processed, the processing tool 7 assumes a certain position on the drilling unit 1 relative to the object 15 to be processed, and penetrates the latter when the drilling unit 1 is moved further in direction to the object 15 to be processed. During this advance movement of the drill 6 through the object 15 to be processed, material is removed from it by the drill 6. The resistance to be overcome by the drill 6 which as a rule correspond to the occurring cutting forces is detected by the piezo sensors 12 and generate voltages U in the piezo sensors 12, depending on their height. These voltages are transmitted to the amplifier unit 14 through the electrical conductor system 13. The amplifier unit 14 from these voltages U generates cutting force-proportional input signals Xe of a control and evaluation unit 20. The control and evaluation unit 20 in addition transmits a signal Xv which represents the advance speed v of the processing tool 7, and a signal Xt which represents the processing time.

With these input signals Xe, Xv, Xt transmitted to the control and evaluation unit 20, it is possible to determine by a software in the control-space and evaluation unit 20 in accordance with the present invention a path S, over which a resistance F produced by the object 15 counteracts the processing tool 7 during its advance movement into the object 15 to be processed. The path S determined by the control-space and evaluation 20 is made available as in an output signal Y of the control and evaluation unit 20 for subsequent processes which will be explained hereinbelow. One or several output signals Y thereby form at least one penetration depth signal Y1 and/or the at least one material thickness signal Y2.

A further process for which the output signals Y of the control an evaluation unit are available is for example the visualization of the generated penetration depth signal Y1 or the material thickness signal Y2. An especially simple form of the visualization is provided when, as shown in FIG. 1, the output signals Y generated by the control and evaluation unit 20 control a known printing or paint spraying machine 21. It provides a marking 23 in the region of the opening 22 produced by the drill 6, which for example explicitedly shows the drilling depth or the material thickness.

In accordance with the present invention, the above described drilling unit 1 can be replaced by any chip-removing or non-chip removing processing machine 2. Such machine for example provides depressions or throughgoing openings in an object 15 to be processed, and can be formed for example as a not shown milling unit.

A preferable use of the inventive method is the drilling through such a composite material 16, which is composed substantially of the carbon fiber plates 17, 19 and the adhesive layer 18, since the carbon fiber plates 17, 19 and the hardenable adhesive material 18 as a rule have significantly fluctuating material thicknesses, so that the determined penetration depths or material thicknesses in the same workpiece 15 can considerable deviate from one another.

Figure 2:
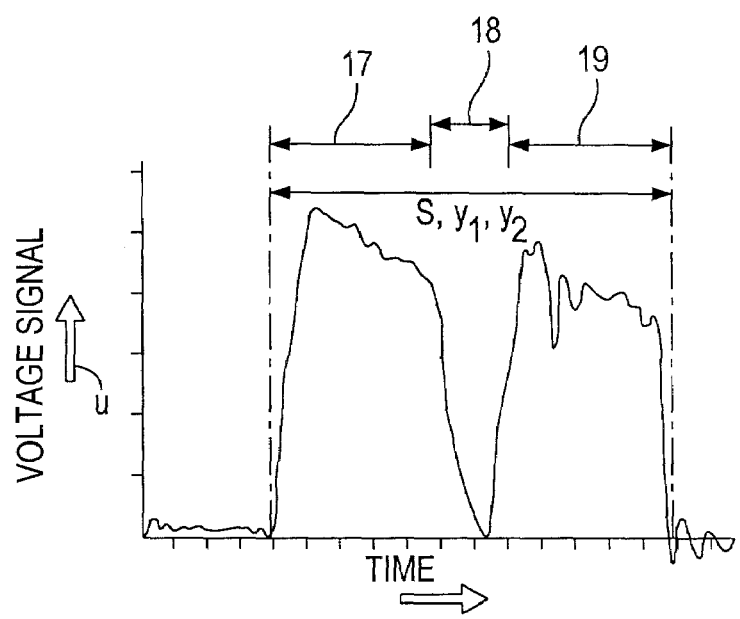
FIG. 2 is a view graphically illustrating the determined voltage signals in dependence on the measuring time.

As shown in FIG. 2, the piezo sensors 12, depending on the material layer 17, 18, 19 through which the processing tool 17 passes, generate different voltage signals U, wherein harder material layers 17, 19 produce higher voltage signals U. In accordance with the present invention the control and evaluation unit 20 generates directly a penetration depth signal Y1 or a material thickness signal Y2 from the determined course of the voltage signals U. The software of the control and evaluation unit 20 takes into consideration that the loads occurring during a removal of the material are significantly higher than the loads caused by friction of the processing tool 7 against the walls of the opening 22 produced by the drill 6.

Figure 3:
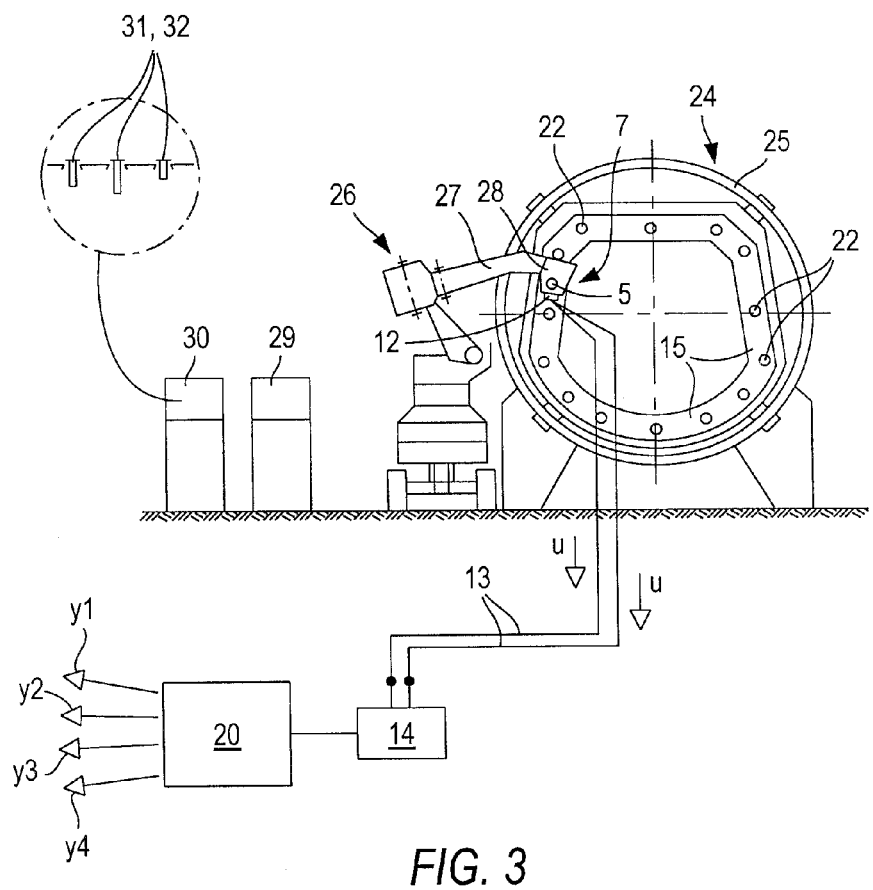
FIG. 3 is a view schematically illustrating a processing and mounting cell which operates in accordance with the inventive method.

As shown in FIG. 3, the inventive method can be used for example in a processing-space and mounting cell 24. The schematically shown processing-space and mounting cell 24 is formed in the shown example by a component support 25 which is turnable in various planes. The component support 25 supports arbitrarily deformed objects 15 to be processed. Furthermore, a processing-space and mounting robot 26 which is movable in different planes is associated with the processing-space and mounting cell 24. Its gripper arm 27 on its upper end takes a known connection piece 28.

In a first working step a clamping chuck 5 is associated with the connection piece 28 and can take different processing tools 7 formed as drills 6 from a supply magazine 29. The corresponding processing tool 7 provides openings 24 in the objects 15 to be processed. During this drilling step the control and evaluation unit 20, as described above, counts the voltage signals U generated by the piezo sensors 20, which finally generate the above described penetration depth signals Y1 or material thickness signals Y2 in the controld and evaluation unit 20.

In addition to the supply magazine 29 for supplying different processing tools 7, a further supply magazine 30 for supplying connecting elements 31, such as for example rivets 32 of different lengths, can be associated with the processing-space and mounting cell 24. In accordance with a further advantageous embodiment of the invention, the control and evaluation unit 20 of the processing tool 7 can be combined with a not shown control of the processing-spaced and mounting robot 26 so that the gripping arm 27 of the processing-space and mounting robot 26 grips such rivets 32 from the supply magazine 30 for the mounting elements 31, whose shaft length L corresponds to the determined penetration depth Y1 or material thickness $Y_2$ or is the closest to it. It is thereby guaranteed that the mass of the corresponding connecting elements 31 remains small. In a further working step the gripping arm 26 finally connects the components 15 fixed in the component support 25 by the connecting elements 1 determined in correspondence with the respective material thickness.

In a further advantageous embodiment, the voltage signal U generated by the piezo sensors 12 can be used in the control and evaluation unit 20 for determination of the wear of the processing tool 7. In the simplest case the control and processing unit 20 generates a wear signal Y3 which acoustically or visually identifies the wear of the processing tool 7 to the operator. With the use of the above described processing-space and mounting cell 24, the generated wear signal Y3 acts directly on the gripper arm 27 so that the gripper arm 27 automatically exchanges the worn out processing tool 7 by another processing tool 7 that is located in the supply magazine 29 and is not worn out.

Furthermore, the control and evaluation unit 20 can generate speed signals Y4 from the voltage signals U, which signals determine the advance speed v or the rotary speed n of the processing tool 7. This has the advantage that the cutting speed of the processing tool 7 can be adjusted in an optimal way to the corresponding material layers 17–19.

It will be understood that each of the elements described above, or two or more together, may also find a useful application in other types of methods and constructions differing from the types described above.

While the invention has been illustrated and described as embodied in method of and device for determination of penetration depth, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for determining a depth of drilling in objects, comprising the steps using a processing machine having a control and evaluation unit associated with sensor means which form signals, measuring by the control and evaluation unit a path over which a resistance produced by an object to be processed counteracts a processing tool during its advance movement, based at least on measurements of a resistance proportional signal and an axial speed proportional signal; using the measured path for determination of a depth of drilling in the object; memorizing the determined drilling depth in the object; having the control and evaluation unit use the determined and memorized drilling depth in the object as an input for having the processing tool select a connecting element; and supplying the selected connecting element to the processing tool directly from a supply means which already stores corresponding connecting elements.

2. A method as defined in claim 1; and further comprising using the determined path for generation of at least one signal selected from the group consisting of a penetration signal, a material thickness signal, and both.

3. A method as defined in claim 1; and further comprising using the at least one signal selected from the group consisting of a penetration signal, a material thickness signal, and both, as an input signal for further processes.

4. A method as defined in claim 3; and further comprising performing at least one of said further processes as a visualization of the at least one generated signal selected from the group consisting of a penetration signal, a material thickness signal, and both of the object near the processing tool, as an input signal for further processes.

5. A method as defined in claim 1; and further comprising using as the processing tool a tool selected from the group consisting of a chip-removing tool and a non-chip removing tool.

6. A method as defined in claim 1; and further comprising using as the processing tool a tool selected from the group consisting of a drill and a mill.

7. A method as defined in claim 1; and further comprising retaining without consideration load fluctuations within a path which is covered by the processing tool during its advance movement through an element selected from the group consisting of the object to be processed and a material composite.

8. A method as defined in claim 1; and further comprising using as the connection element a rivet with a rivet shaft length selected in correspondence with the at least one signal selected from the group consisting of a penetration depth, a material thickness and both.

9. A method as defined in claim 1; and further comprising generating a wear signal which corresponds to wear of the processing tool, with consideration of the resistance to the processing tool during covering the path.

10. A method as defined in claim 1; and further comprising generating a speed signal which determines a parameter of the processing tool selected from the group consisting of an advance speed and a rotary speed, based on a covered path and on the resistance counteracting the processing tool.

11. A method as defined in claim 1; and further comprising using piezosensors for measuring the path.

12. A device for determination of a penetration depth, comprising a processing machine; a guiding carriage displaceably guided over at least one guide track; sensor means mounted on said guiding carriage; a signal amplification unit and a control and evaluation unit associated with said sensors and forming input signals of said control and evaluation unit from voltage signals generated by said sensors, said control evaluation unit being formed so as to provide measuring a path over which a resistance produced by an object to be processed counteracts a processing tool during its advance movement, based at least on measurements of a resistance proportional signal and an axial speed proportional signal, using the measured path for determination of a depth of drilling in the object, memorizing the determined drilling depth in the object, using the determined and memorized drilling depth in the object as an input for having the processing tool select a connecting element and supplying the selected connecting element to the processing tool directly from a supply means which already stores corresponding connecting elements.

13. A device as defined in claim 12, wherein said processing machine is provided with at least one processing tool; and further comprising a processing-space and mounting robot associated with said processing machine, said control and evaluation unit generating output signals which provide an automatic taking from supply magazines of elements selected from the group consisting of connection elements, processing tools, and both.

14. A method for determining a depth of drilling in objects, comprising the steps using a processing machine having a control and evaluation unit associated with sensor means which form signals, measuring by the control and evaluation unit a path over which a resistance produced by an object to be an object to processed counteract a processing tool during its advance movement, based on sensing a resistance proportional signal and at least one axial speed proportional signal; using the measured path for determination of a depth of drilling in the object by using the resistance proportional signal and the axial speed proportional signal as input signals of said control and evaluation unit, calculating by the control and evaluation unit a depth proportional output signal, and defining at least a penetration depth signal by the output signal; memorizing the determined drilling depth in the object; having the control and evaluation unit use the determined and memorized drilling depth in the object as an input for having the processing tool select a connecting element; and supplying the selected connecting element to processing tool directly from a supply means which already stores corresponding connecting elements.

* * * * *